(12) United States Patent
Makinouchi et al.

(10) Patent No.: US 12,179,492 B2
(45) Date of Patent: Dec. 31, 2024

(54) MAINTENANCE LIQUID FOR SOLVING EJECTION PROBLEM OF UV CURABLE INKJET PRINTER

(71) Applicant: MIMAKI ENGINEERING CO., LTD., Nagano (JP)

(72) Inventors: Takahito Makinouchi, Nagano (JP); Kazuki Ohara, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 460 days.

(21) Appl. No.: 17/371,096

(22) Filed: Jul. 8, 2021

(65) Prior Publication Data

US 2022/0009236 A1 Jan. 13, 2022

(30) Foreign Application Priority Data

Jul. 10, 2020 (JP) .................. 2020-119315

(51) Int. Cl.
*B41J 2/165* (2006.01)
*B08B 3/08* (2006.01)
(Continued)

(52) U.S. Cl.
CPC ............. *B41J 2/16552* (2013.01); *B08B 3/08* (2013.01); *C09D 11/101* (2013.01);
(Continued)

(58) Field of Classification Search
CPC ......... B41J 2/16552; B41J 2/165; B08B 3/08; C09D 11/101; C09D 11/107; C09D 11/38;
(Continued)

(56) References Cited

U.S. PATENT DOCUMENTS 10,301,487 B2 * 5/2019 Takahashi ............ C09D 11/102
2014/0092168 A1 * 4/2014 Ito ......................... C09D 11/54
106/31.86

FOREIGN PATENT DOCUMENTS

JP 2015112722 6/2015
JP 2015139976 8/2015
(Continued)

OTHER PUBLICATIONS

"Office Action of Japan Counterpart Application", issued on Feb. 6, 2024, with English translation thereof, p. 1-p. 9.
(Continued)

*Primary Examiner* — Bradley W Thies
(74) *Attorney, Agent, or Firm* — JCIPRNET

(57) ABSTRACT

Provided are a maintenance liquid and a maintenance method that can solve an ejection problem of a UV curable inkjet printer. The maintenance liquid includes: a first ingredient in which a water-soluble compound is soluble and a cured matter of a UV curable ink is insoluble. The maintenance method includes: a first cleaning process at which a water-soluble compound that adheres to an inkjet head included in the UV curable inkjet printer is dissolved by a first maintenance liquid including the first ingredient in which the water-soluble compound is soluble and a cured matter of a UV curable ink is insoluble, and a second cleaning process at which the inkjet head is cleaned by a second maintenance liquid including a second ingredient in which the water-soluble compound is insoluble and the cured matter of the UV curable ink is soluble.

5 Claims, 13 Drawing Sheets

(51) Int. Cl.
  *C09D 11/101* (2014.01)
  *C09D 11/107* (2014.01)
  *C09D 11/38* (2014.01)
  *C11D 7/26* (2006.01)
  *C11D 7/30* (2006.01)
  *C11D 7/32* (2006.01)
  *C11D 7/50* (2006.01)

(52) U.S. Cl.
  CPC ............ *C09D 11/107* (2013.01); *C09D 11/38* (2013.01); *C11D 7/261* (2013.01); *C11D 7/263* (2013.01); *C11D 7/266* (2013.01); *C11D 7/30* (2013.01); *C11D 7/32* (2013.01); *C11D 7/5022* (2013.01); *C11D 2111/20* (2024.01)

(58) Field of Classification Search
  CPC ......... C09D 11/36; C09D 11/40; C11D 7/261; C11D 7/263; C11D 7/266; C11D 7/30; C11D 7/32; C11D 7/5022; C11D 11/0041
  See application file for complete search history.

(56) References Cited

FOREIGN PATENT DOCUMENTS

| | | |
|---|---|---|
| JP | 2016087939 | 5/2016 |
| JP | 2016124212 | 7/2016 |
| JP | 2018184001 | 11/2018 |

OTHER PUBLICATIONS

"Office Action of Japan Counterpart Application", issued on Jun. 18, 2024, with English translation thereof, p. 1-p. 8.

"Decision of Refusal of Japan Counterpart Application", issued on Oct. 29, 2024, with English translation thereof, p. 1-p. 2.

"Decision of Dismissal of Amendment of Japan Counterpart Application", issued on Oct. 29, 2024, with English translation thereof, p. 1-p. 6.

\* cited by examiner

MAINTENANCE LIQUID FOR SOLVING EJECTION PROBLEM OF UV CURABLE INKJET PRINTER

CROSS REFERENCE TO RELATED APPLICATIONS

This application claims the priority benefit of Japanese Patent Application No. 2020-119315, filed on Jul. 10, 2020. The entirety of the above-mentioned patent application is hereby incorporated by reference herein and made a part of this specification.

TECHNICAL FIELD

The present invention relates to a maintenance liquid and a maintenance method.

BACKGROUND ART

An ultraviolet (UV) curable inkjet printer has characteristics that, among other things, volatile organic compounds (VOC) are hardly generated, that there is no drying time necessary after printing, and that a light resistance is superior; so, development thereof is underway. In the UV curable inkjet printer, in order to eliminate the drying time after printing, a UV curable ink is cured by UV rays immediately after this ink is ejected from a head nozzle. However, when the curing is conducted in the way like this, an ejection problem of an ink can sometimes happen.

It has been known that the ejection problem occurs due to the following causes. Namely, because of a stray light that is generated outside of a light path that was expected originally, UV rays radiate to the ink around the head nozzle to cause curing of the ink, resulting in formation of an ink cured matter in the head nozzle, or penetration of a foreign matter into the head nozzle, thereby causing clogging in the nozzle.

In order to prevent the nozzle clogging like this, in the UV curable inkjet printer, maintenance of the printer head is conducted.

A known example of the maintenance method for the UV curable inkjet printer includes a method in which around the printer head or a nozzle of the printer head is periodically cleaned with an ink itself or with a maintenance liquid having a high affinity with the ink to remove from the nozzle head the foreign matter that causes the problem in advance.

In Patent Literature 1, the maintenance method like this is described with which the inkjet head nozzle of the UV curable inkjet printer is cleaned with a cleaning liquid containing an alkylene glycol derivative. Also, in Patent Literature 1, organic solvents customary used as the ink solvent such as alkylene glycol derivatives are described as the examples of the cleaning liquid.

Patent Literature 1: Japanese Unexamined Patent Publication No. 2015-139976

SUMMARY

However, in the nozzle clogging of the UV curable inkjet printer, there has been the case that the nozzle clogging could not be solved even when the nozzle cleaning was carried out by using, as the cleaning liquid, an organic solvent that had been customary used as the ink solvent.

In the UV curable ink, in order to instantly cause the reaction after application thereof by photopolymerization to form a cured film, most of the composition thereof is occupied by a hydrophobic monomer. Because of this, the UV curable ink is poor in the affinity with water, so that if it is used in a high humidity environment such as in summer, a foreign matter can be sometimes formed. Especially in the printer using the UV curable ink, this foreign matter develops to the nozzle clogging thereby readily causing the ejection problem.

The present invention was made considering the situation as mentioned above; so, the present invention provides a maintenance liquid and a maintenance method that can solve the ejection problem of the UV curable inkjet printer.

The inventors of the present invention carried out the study about the problem mentioned above. Then, it was found that a flight curvature readily takes place especially in the nozzle of a UV primer (UV curable primer), and that even if the nozzle was cleaned with a customary cleaning liquid, the flight curvature could not be solved, and that the change of the nozzle head thereof could solve the flight curvature. Therefore, the inventors of the present invention closely checked this head, and then it was found that many transparent, crystalline foreign matters adhered to the wall in the head nozzle hole.

The elemental analysis of these foreign matters revealed that they are hydrocarbon-based foreign matters that include phosphorous, metal components of the head, light elements, and the like. From this analysis result, it was presumed that these foreign matters were formed, with humidity as a trigger, by a reaction of an acidic monomer included in the UV primer with a polymerization initiator that contains phosphorous as the constituent element thereof. From the study of physical properties of the foreign matters, it was found that they were soluble in water but hardly soluble in a solvent, and that removal thereof was difficult by conventional maintenance liquids, such as diethyleneglycol monoethyl ether acetate, which have affinity with the UV curable ink and have been used as the maintenance liquids for the UV curable inkjet printer.

The inventors of the present invention further studied, and then found a compound that can dissolve the foreign matters and yet does not cause an adverse effect to the ink that is used. They further studied the maintenance liquid and the maintenance method using this; as a result, the present invention could be completed.

Namely, the maintenance liquid according to a first aspect of the present invention is a maintenance liquid for a UV curable inkjet printer, wherein
  the maintenance liquid includes a first ingredient in which a water-soluble compound is soluble and a cured matter of a UV curable ink is insoluble.

The maintenance liquid having the above-mentioned composition can solve the ejection problem of the UV curable inkjet printer.

The UV curable ink includes an acidic monomer and an initiator, wherein
  the water-soluble compound is preferably a compound originated from the acidic monomer, the initiator, and water.

The maintenance liquid having the above-mentioned composition has highly effective to solve the ejection problem of a primer ink.

It is preferable that a phosphorous-based initiator is used as the initiator.

The maintenance liquid having the above-mentioned composition is especially effective to solve the ejection problem of the primer ink containing the phosphorous-based initiator as the initiator.

The first ingredient is preferably diethyleneglycol.

The maintenance liquid having the above-mentioned composition is low in an influence on the ink.

It is preferable that the maintenance liquid further includes a second ingredient in which the water-soluble compound is insoluble and the cured matter of the UV curable ink is soluble.

The maintenance liquid having the above-mentioned composition can remove the cured matter of the UV curable ink and the water-soluble compound by one liquid.

The maintenance method according to a second aspect of the present invention is a maintenance method for a UV curable inkjet printer, wherein the maintenance method includes:
- a first cleaning process at which a water-soluble compound that adheres to an inkjet head included in the UV curable inkjet printer is dissolved by a first maintenance liquid including a first ingredient in which the water-soluble compound is soluble and a cured matter of a UV curable ink is insoluble; and
- a second cleaning process at which the inkjet head is cleaned by a second maintenance liquid including a second ingredient in which the water-soluble compound is insoluble and the cured matter of the UV curable ink is soluble.

The maintenance method having the above-mentioned composition can solve the ejection problem of the UV curable inkjet printer.

The UV curable ink includes an acidic monomer and an initiator, wherein
- the water-soluble compound is preferably a compound originated from the acidic monomer, the initiator, and water.

The maintenance method having the above-mentioned composition is highly effective to solve the ejection problem of the primer ink.

It is preferable that the initiator is a phosphorous-based initiator.

The maintenance method having the above-mentioned composition is especially effective to solve the ejection problem of the primer ink containing the phosphorous-based initiator as the initiator.

It is preferable that the first ingredient is diethyleneglycol and the second ingredient is diethyleneglycol monoethyl ether acetate.

The maintenance method having the above-mentioned composition is low in an influence on the ink.

According to the maintenance liquid relating to the present invention, the ejection problem of the UV curable inkjet printer can be solved.

DESCRIPTION OF EMBODIMENTS

Maintenance Liquid

Figure 1:
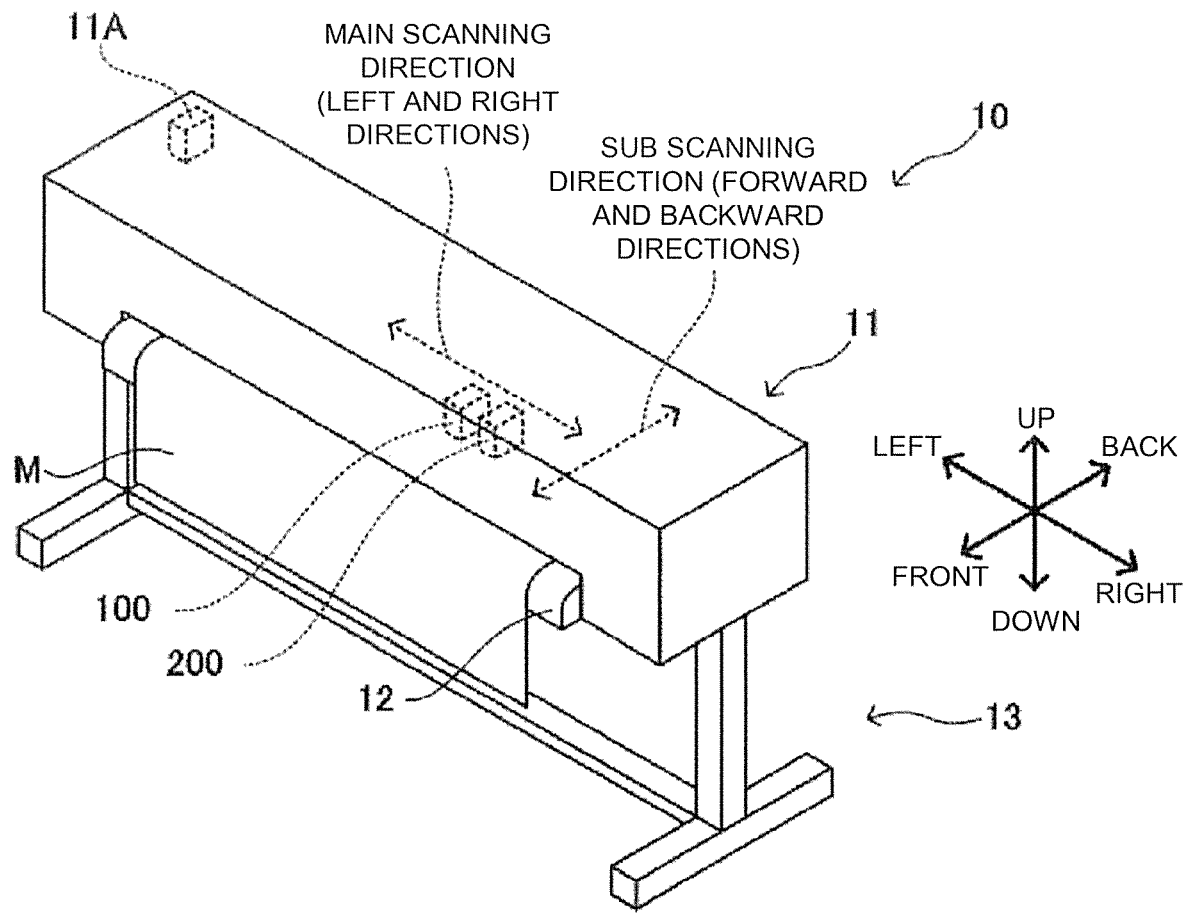
FIG. 1 is a schematic entire drawing of the UV curable inkjet printer that uses the maintenance liquid according to one embodiment of the present invention.

The maintenance liquid according to one embodiment of the present invention is a maintenance liquid for a UV curable inkjet printer, wherein
- the maintenance liquid includes a first ingredient in which a water-soluble compound is soluble and a cured matter of a UV curable ink is insoluble.

The water-soluble compound according to the present invention is a compound that is soluble in water and, for example, a crystal-like solid matter that is formed in the nozzle of an inkjet printer due to an influence of humidity or the like upon using the UV curable inkjet printer. This water-soluble compound tends to be readily formed when an acidic monomer is included in the UV curable ink. The water-soluble compound is originated from the acidic monomer and an initiator (for example, a phosphorous-based initiator) included in the UV curable ink; this compound may sometimes include metals that are included in the composition material of the inkjet head.

UV Curable Ink

The UV curable ink containing the acidic monomer is used, for example, as a primer ink, and further includes an initiator. The primer ink is used, for example, when a base material that is difficult to adhere with a usual UV curable ink, such as, for example, a resin, a metal, and a glass; so, this is used in order to improve adhesion of other UV curable ink.

Examples of the acidic monomer include the monomers having a COOH group. Specific examples thereof include acrylic acid, methacrylic acid, 2-(trifluoromethyl) acrylate, ω-carboxy-polycaprolactone (n≈2) monoacrylate, monohydroxyethylacrylate phthalate, and polybasic acid-modified acryl oligomer. Among these, ω-carboxy-polycaprolactone (n≈2) monoacrylate is preferable.

Illustrative examples of the monomers having the COOH group that can be used include monofunctional acrylate M-5300 (ω-carboxy-polycaprolactone (n≈2) monoacrylate), M-5400 (monohydroxyethylacrylate phthalate), M-510 (polybasic acid-modified acryl oligomer), and M-520 (polybasic acid-modified acryl oligomer), all of which are manufactured by Toagosei Co., Ltd.

The initiator included in the UV curable ink that contains the acidic monomer is not particularly restricted so far as the UV curable ink can be cured by UV rays. An example thereof is a phosphorous-based initiator.

Examples of the phosphorous-based initiator include phosphine oxide-based initiators. The phosphine oxide-based initiators are the phosphine oxide compounds represented by the following formula (1).

[Chem. 1]

(1)

(In the formula (1), $R^1$, $R^2$, and $R^3$ each represents independently hydrogen or a hydrocarbon group optionally having a substituent.)

Specifically, $R^1$, $R^2$, and $R^3$ each is independently a phenyl group, an acyl group, and the like.

More specifically, examples of the phosphine oxide-based initiator include acyl phosphine oxide-based photopolymerization initiators such as 2,4,6-trimethylbenzoyl-diphenyl phosphine oxide that is illustrated by the following formula (2) and

[Chem. 2]

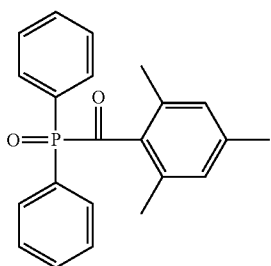
(2)

bis(2,4,6-trimethylbenzoyl)phenylphosphine oxide that is illustrated by the following formula (3).

[Chem. 3]

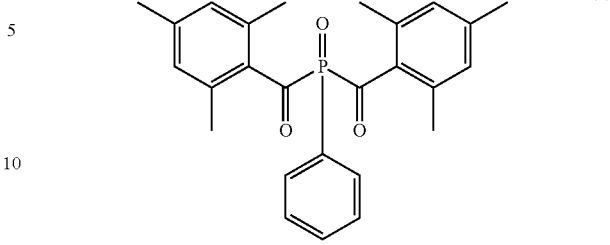
(3)

The initiator is preferably phosphorous-based initiators, more preferably phosphine oxide-based initiators, and still more preferably acyl phosphine oxide-based photopolymerization initiators, while especially preferably 2,4,6-trimethylbenzoyl-diphenyl phosphine oxide and bis(2,4,6-trimethylbenzoyl)phenylphosphine oxide.

Illustrated examples of the initiator that can be used include 2,4,6-trimethylbenzoyl-diphenyl phosphine oxide (tradename: Omnirad TPO H (old tradename by BASF: Irgacure TPO)) and bis(2,4,6-trimethylbenzoyl)phenylphosphine oxide (tradename: Omnirad 819 (old tradename by BASF: Irgacure 819)), both of which are manufactured by IGM Resins B. V. These initiators may be used singly or as a combination of plurality of them.

The UV curable ink may further include a monomer other than the acidic monomer. Examples of the monomer other than the acidic monomer include monomers having the esterified COOH group of (meth)acylate.

Illustrated examples of the acrylate other than the acidic monomer include monofunctional acrylates, bifunctional acrylates, and polyfunctional acrylates.

Illustrative examples of the monofunctional acrylate include phenol EO-modified acrylate, nonylphenol EO-modified acrylate, and ethoxydiethyleneglycol acrylate. Illustrative examples of the bifunctional acrylate include hexanediol diacrylate, hexanediol EO-modified diacrylate, neopentylglycol diacrylate hydroxypivalate, neopentylglycol PO-modified diacrylate, tripropyleneglycol diacrylate, dipropyleneglycol diacrylate, bisphenol A EO-modified diacrylate, polyethyleneglycol diacrylate, and polypropyleneglycol diacrylate. Illustrative examples of the polyfunctional acrylate include trimethylolpropane triacrylate, trimethylolpropane EO-modified triacrylate, trimethylolpropane PO-modified triacrylate, glycerinpropoxy triacrylate, pentaerythritol triacrylate, pentaerythritol EO-modified tetraacrylate, ditrimethylolpropane tetraacrylate, and dipentaerythritol hexaacrylate.

These monomers may be used singly or as a combination of a plurality thereof.

Illustrative examples of the monofunctional acrylate that can be used include phenol EO-modified (n=2) acrylate (tradename: Miramer M142), phenol EO-modified (n=4) acrylate (tradename: Miramer M144), nonylphenol EO-modified (n=8) acrylate (tradename: Miramer M166), and ethoxydiethyleneglycol acrylate (tradename: Miramer M170), all of which are manufactured by Miwon Specialty Chemical Co., Ltd.

Illustrative examples of the bifunctional acrylate that can be used include hexanediol diacrylate (tradename: Miramer M200), hexanediol EO-modified diacrylate (tradename: Miramer M202), neopentylglycol diacrylate hydroxypivalate (tradename: Miramer M210), neopentylglycol PO-modified (n=2) diacrylate (tradename: Miramer M216), tripropyleneglycol diacrylate (tradename: Miramer M220), dipropyleneglycol diacrylate (tradename: Miramer M222), bisphenol A EO-modified (n=4) diacrylate (tradename: Miramer M240), bisphenol A EO-modified (n=10) diacrylate (tradename: Miramer M2100), polyethyleneglycol (molecular weight 400) diacrylate (abbreviated name: PEG400DA, tradename: Miramer M280), polyethyleneglycol (molecular weight of 300) diacrylate (abbreviated name: PEG300DA, tradename: Miramer M284), and polypropyleneglycol diacrylate (tradename: Miramer M2040), all of which are manufactured by Miwon Specialty Chemical Co., Ltd.

Illustrative examples of the polyfunctional acrylate that can be used include trimethylolpropane triacrylate (tradename: Miramer M300), trimethylolpropane EO-modified (n=3) triacrylate (tradename: Miramer M3130), trimethylolpropane EO-modified (n=6) triacrylate (tradename: Miramer M3160), trimethylolpropane EO-modified (n=9) triacrylate (tradename: Miramer M3190), trimethylolpropane PO-modified (n=3) triacrylate (tradename: Miramer M360), glycerinpropoxy triacrylate (tradename: Miramer M320), pentaerythritol triacrylate (tradename: Miramer M340), pentaerythritol EO-modified tetraacrylate (tradename: Miramer M4004), ditrimethylolpropane tetraacrylate (tradename: Miramer M410), and dipentaerythritol hexaacrylate (tradename: Miramer M600), all of which are manufactured by Miwon Specialty Chemical Co., Ltd.

First Ingredient

The first ingredient according to the present invention is the ingredient in which the water-soluble compound is soluble and the cured matter of the UV curable ink is insoluble. Here, the cured matter of the UV curable ink is a solid matter that is formed by polymerization of the UV curable ink by the action of UV rays.

Preferable examples of the first ingredient include diols such as ethyleneglycol.

As described later, because the maintenance liquid including the first ingredient is used for the inkjet head included in the UV curable inkjet printer, it is desirable that the first ingredient does not cause an adverse effect to the UV curable ink after this is used. Preferable examples of the ingredient include those that are inert to the UV curable ink, those with which the maintenance liquid after having been used for maintenance can be easily removed, and those that are highly safe. The first ingredient like this is preferably diols having a low molecular weight; here, diethyleneglycol is especially preferable.

Although the content rate of the first ingredient in the maintenance liquid is not particularly restricted, this is preferably in the range of 1 to 100% by mass, both inclusive, and more preferably in the range of 50 to 100% by mass, both inclusive, while still more preferably in the range of 90 to 100% by mass, both inclusive. From a viewpoint of an influence on the UV curable ink, the water content in the maintenance liquid is preferably low; specifically, this is preferably 10% or less by mass, more preferably 5% or less by mass, and still more preferably 1% or less by mass, while especially preferably 0.5% or less by mass.

Second Ingredient

The maintenance liquid may further include a second ingredient in which the water-soluble compound is insoluble and the cured matter of the UV curable ink is soluble.

The second ingredient may be further included in the maintenance liquid that includes the first ingredient as described before, or this may be included in a maintenance liquid that is different from the maintenance liquid that includes the first ingredient, and then, this resulting maintenance liquid may be used together with the maintenance liquid that includes the first ingredient.

Examples of the second ingredient like this include ingredients used in the conventional maintenance liquid for the UV curable inkjet printer. The maintenance liquid including the second ingredient can remove, among other things, a dirt due to a colorant and a cured matter of the UV curable ink that is formed by curing with a stray light thereby being attached to the inkjet head.

Examples of the second ingredient include alcohols that are different from those of the first ingredient. Specific examples thereof include diethyleneglycol monoethyl ether acetate. Although the content rate of the second ingredient in the maintenance liquid is not particularly restricted, this is preferably in the range of 1% or greater to less than 100% by mass, while more preferably in the range of 10% to less than 90% by mass.

Maintenance Method

Next, one embodiment of the maintenance method for the UV curable inkjet printer 10 using the above-mentioned maintenance liquid will be described with referring to the drawings.

Schematic Composition of UV Curable Inkjet Printer 10

As illustrated in FIG. 1, a UV curable inkjet printer 10 has a printer main body 11, a conveying device 12, and a stand 13. The inkjet printer 10 is configured to be able to print an image on a medium M (such as paper and plastics) by an inkjet method.

The printer main body 11, which is the part to print an image, is supported, together with the conveying device 12, by the stand 13. The conveying device 12 conveys the medium M from a back to a front along the sub scanning directions (forward and backward directions) by means of a roller or the like. The printer main body 11 has a first head unit 100 and a second head unit 200 that are configured to eject an ink to the medium M by the inkjet method. The first head unit 100 and the second head unit 200 are mounted on a carriage (not illustrated in the figure) that is arranged in such a way as to be movable in the main scanning directions, so that the head units move along the main scanning direction with the movement of the carriage. The printer main body 11 also has a controller 11A that controls the action of the inkjet printer 10. Also, although the details of this will be described later, the printer main body 11 has a maintenance mechanism 500 (not illustrated in FIG. 1, but illustrated in FIG. 5 and so forth) to maintain (clean) the first head unit 100 and the second head unit 200.

In the UV curable inkjet printer 10, a process at which the first head unit 100 and the second head unit 200 eject an ink and radiate UV rays to cure the ink with moving along the main scanning direction, and a process at which the conveying device 12 causes to move the medium M along the sub scanning direction are repeated. These processes are carried out under the control of the controller 11A. By repeating these processes, an image is formed (printed) on the medium M by the ejected ink.

First Head Unit 100 and Second Head Unit 200

Figures 2A, 2B:
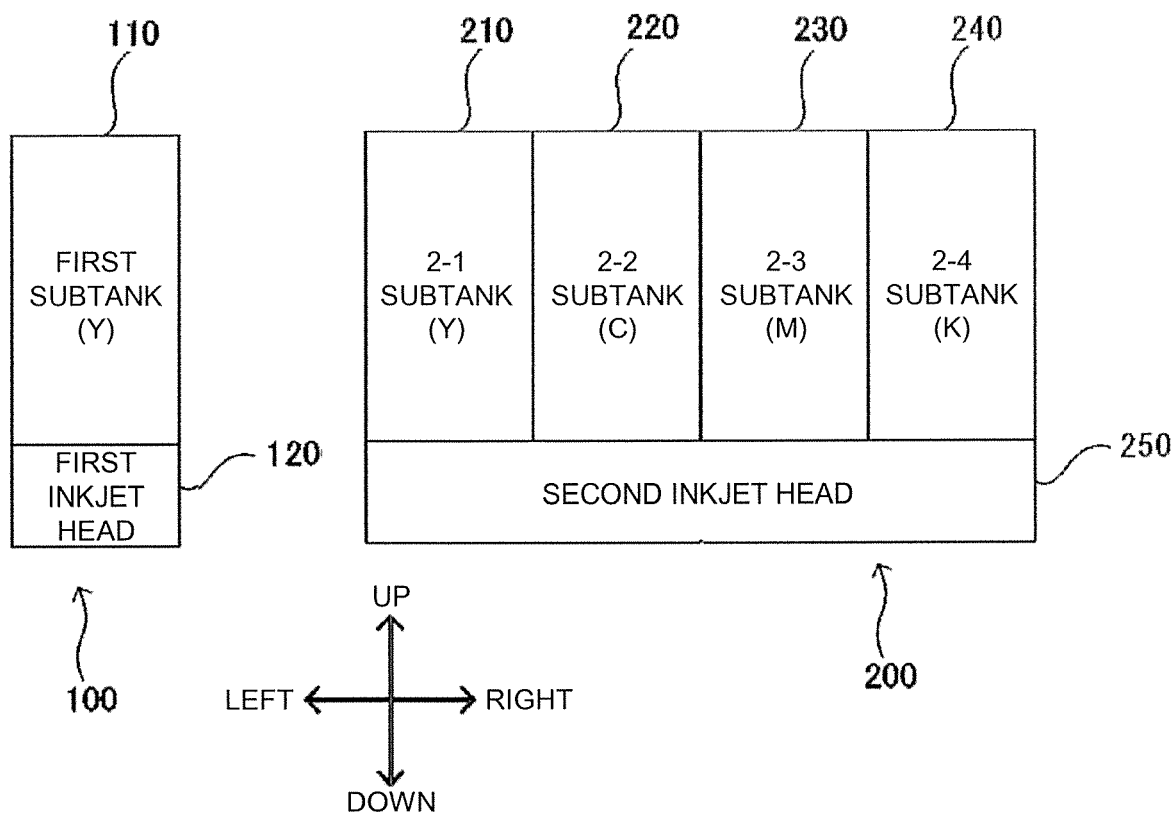
FIG. 2A is a composition drawing of the first head unit.
FIG. 2B is a composition drawing of the second head unit.

As illustrated in FIG. 2A, the first head unit 100 has a first subtank 110 and a first inkjet head 120. The first subtank 110 is arranged on the first inkjet head 120.

The first subtank 110 stores an ink of a primer (hereinafter, this is also called primer ink). The first inkjet head 120 ejects the primer ink that is supplied from the first subtank 110. The first inkjet head 120 ejects the ink as a droplet with a piezo method or a thermal method.

As illustrated in FIG. 2B, the second head unit 200 has a 2-1 subtank 210, a 2-2 subtank 220, a 2-3 subtank 230, and a 2-4 subtank 240, as well as a second inkjet head 250. The 2-1 subtank 210, the 2-2 subtank 220, the 2-3 subtank 230, and the 2-4 subtank 240 are arranged on the second inkjet head 250.

The 2-1 subtank 210 stores a Y (yellow) ink (hereinafter, this is also called a yellow ink). The 2-2 subtank 220 stores a C (cyan) ink (hereinafter, this is also called a cyan ink). The 2-3 subtank 230 stores an M (magenta) ink (hereinafter, this is also called a magenta ink). The 2-4 subtank 240 stores a K (key plate; here black) ink (hereinafter, this is also called a black ink). The second inkjet head 250 separately ejects the yellow ink, the cyan ink, the magenta ink, and the black ink that are supplied from the 2-1 subtank 210, the 2-2 subtank 220, the 2-3 subtank 230, and the 2-4 subtank 240, respectively. The second inkjet head 250 ejects these inks as a droplet with a thermal method or a piezo method.

Ink-Supplying Mechanism

The printer main body 11 also has an ink-supplying mechanism (not illustrated in the figure) with which each ink is supplied to the first subtank 110, the 2-1 subtank 210, the 2-2 subtank 220, the 2-3 subtank 230, and the 2-4 subtank 240, respectively.

Each of the five subtanks is equipped with a liquid level sensor (not illustrated in the figure) to detect the liquid level of the ink. On the basis of the signal from the liquid level sensor, the controller 11A separately controls each pump (not illustrated in the figure) of the ink-supplying mechanism in a such a way that each of the five subtanks may be filled above a certain amount. For example, when the liquid level sensor detects that the liquid level of the ink that is stored in the first subtank 110 is lowered below a prescribed position, the controller 11A controls to cause the pump drive to supply the primer ink from a bottle tank to the first subtank 110.

Because the five subtanks are configured to always store the ink, the supply path from the subtank to the ink ejection port of the first inkjet head 120 or of the second inkjet head 250 is filled with the ink. When a positive pressure is supplied to the subtank, the ink in the subtank is pressed to be ejected out (purged out) from the ejection port of the first inkjet head 120 or of the second inkjet head 250. For example, when the positive pressure is supplied to the first subtank 110, the primer ink is ejected out from an ejection port 121A (FIG. 4) of the primer ink in the first inkjet head 120.

Ejection Units of the First Inkjet Head 120 and of the Second Inkjet Head 250

Figure 3A:
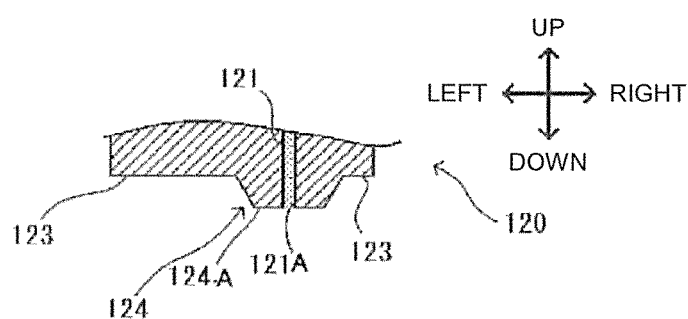
FIG. 3A is a section view of the first inkjet head cut in a transverse direction.
Figure 3B:
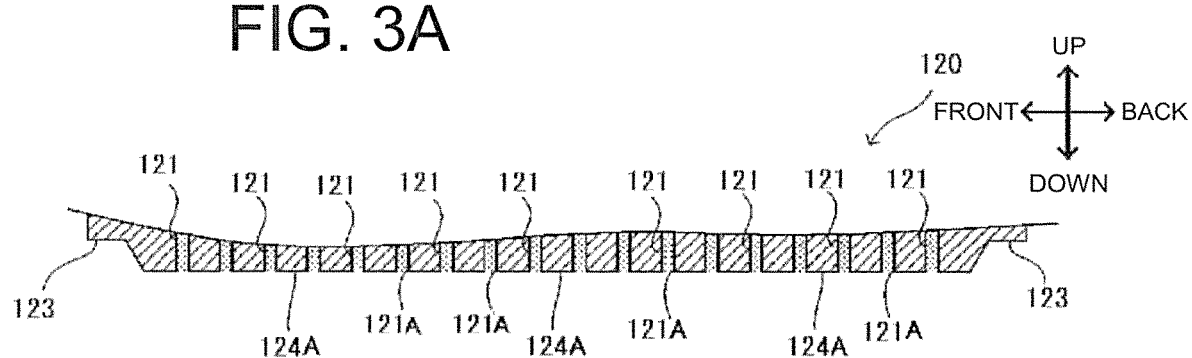
FIG. 3B is a section view of the first inkjet head cut in a longitude direction.

As illustrated in FIG. 3A and FIG. 3B, the lower part of the inkjet head 120 is an ejection unit to eject the primer ink. The ejection unit of the first inkjet head 120 has, besides a plurality of ejection nozzles 121, a lower surface 123 that is facing downward and a protruding portion 124 that protrudes from the lower surface 123.

A plurality of the ejection nozzles 121 is configured to pass through in the protruding portion 124. The ejection nozzles 121 are arranged along the sub scanning direction; here, each of the nozzles can independently eject the primer ink.

The lower surface 123 constitutes the lower surface of the first inkjet head 120, and is also the area surrounding the protruding portion 124.

The protruding portion 124 is longitude in the sub scanning direction; and this is formed in the shape of a trapezoid in which the transverse section cut in the main scanning direction is a quadrangular pyramid.

The protruding portion 124 has an ejection surface 124A, which is a lower surface facing downward (the lowest surface, corresponding to the upper surface of the quadrangular pyramid). In the ejection surface 124A, a lower side opening of the ejection nozzle 121, namely, the ejection port 121A of the primer ink, is arranged.

Figure 4:
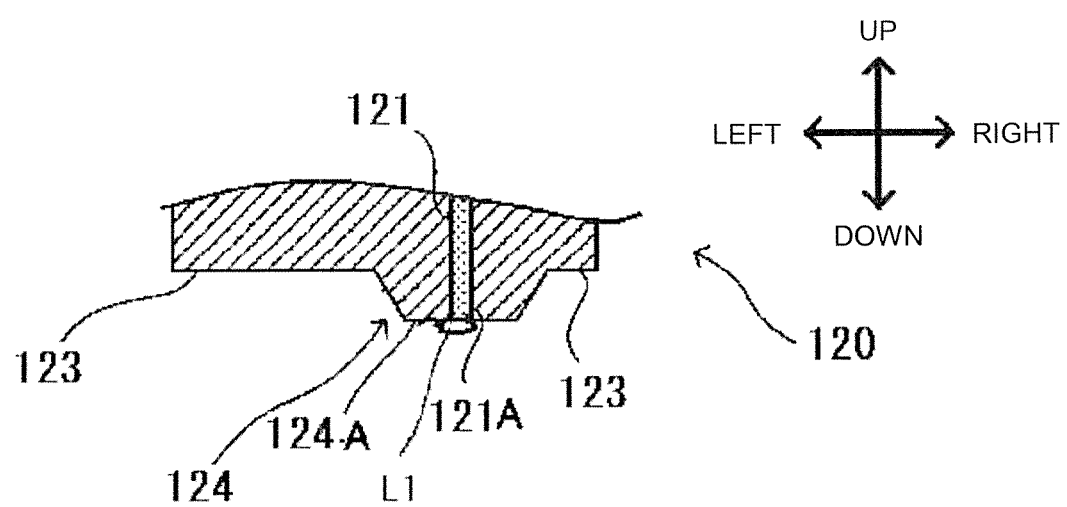
FIG. 4 is a conceptual drawing that illustrates the state of the foreign matters adhering to the first inkjet head of FIG. 3A.

As depicted in FIG. 4, repeating of printing with ejecting the primer ink can sometimes cause clogging around the ejection port 121A due to formation of a water-soluble compound L1.

Maintenance Mechanism 500

The maintenance mechanism 500 of the printer main body 11 is the mechanism to conduct the maintenance to prevent clogging and the like at the ejection nozzle 121 of the first inkjet head 120. When the first head unit 100 and the second head unit 200 are at a waiting position, a maintenance operation is carried out at a proper timing.

Figure 5:
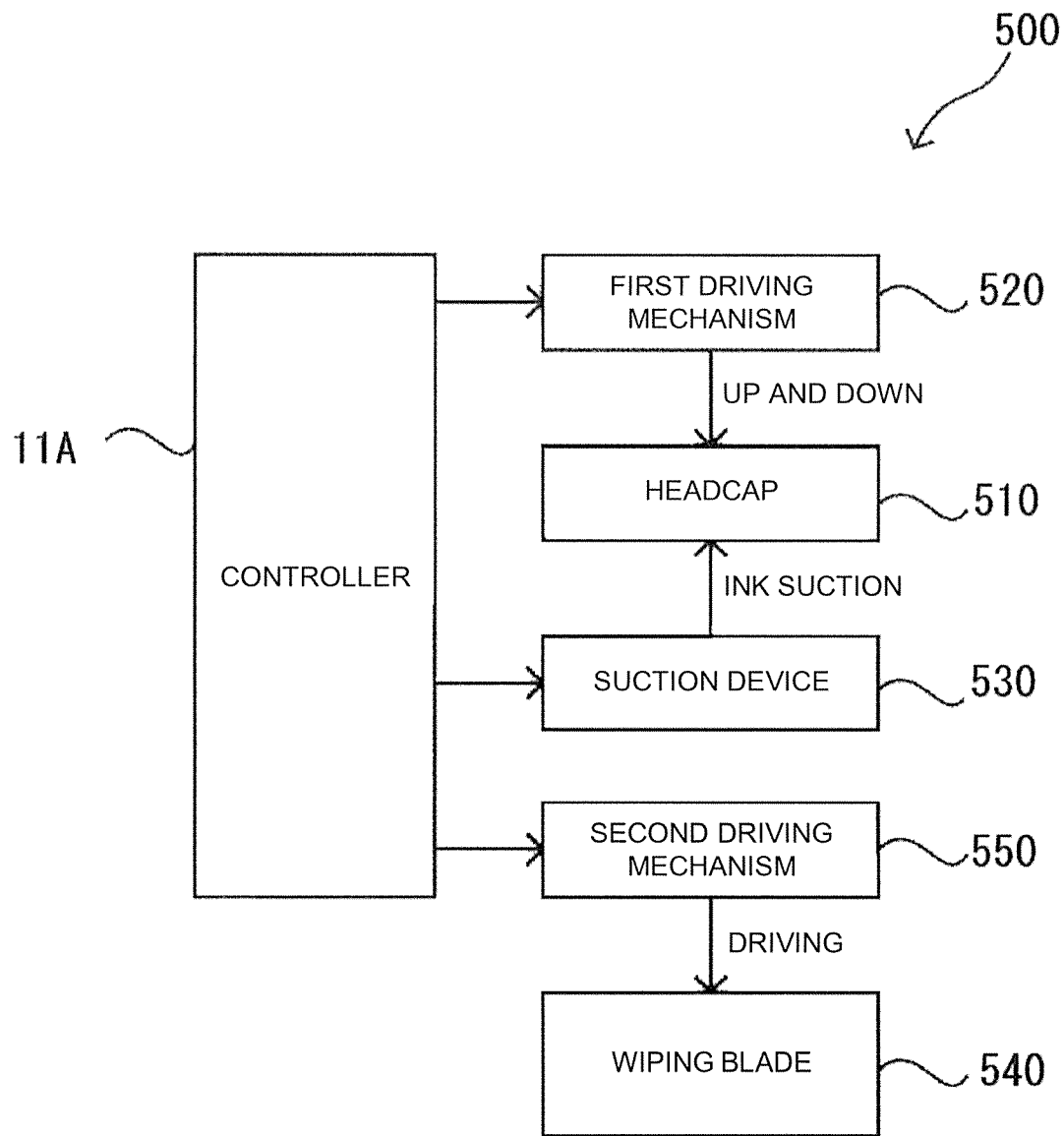
FIG. 5 is a composition drawing of the maintenance mechanism.

As illustrated in FIG. 5, the maintenance mechanism 500 has a headcap 510, a first driving mechanism 520, a suction device 530, a wiping blade 540, and a second driving mechanism 550. The controller 11A causes, as described later, the first driving mechanism 520 to move the headcap 510 up and down, the suction device 530 to suck the ink from the suction device 530, and the second driving mechanism 550 to drive the wiping blade 540. The maintenance mechanism 500 is prepared for the first inkjet head 120. Hereinafter, the maintenance mechanism for the first inkjet head 120 will be explained.

Figure 6A:
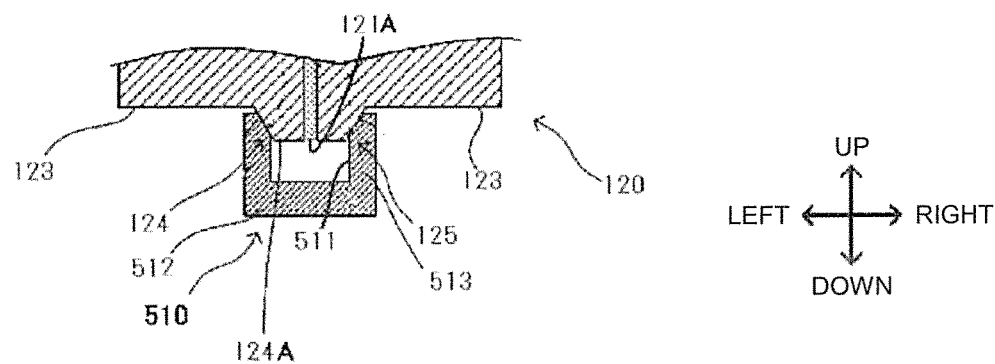
FIG. 6A is a section view of the headcap attached to the first inkjet head and cut in a transverse direction.
Figure 6B:
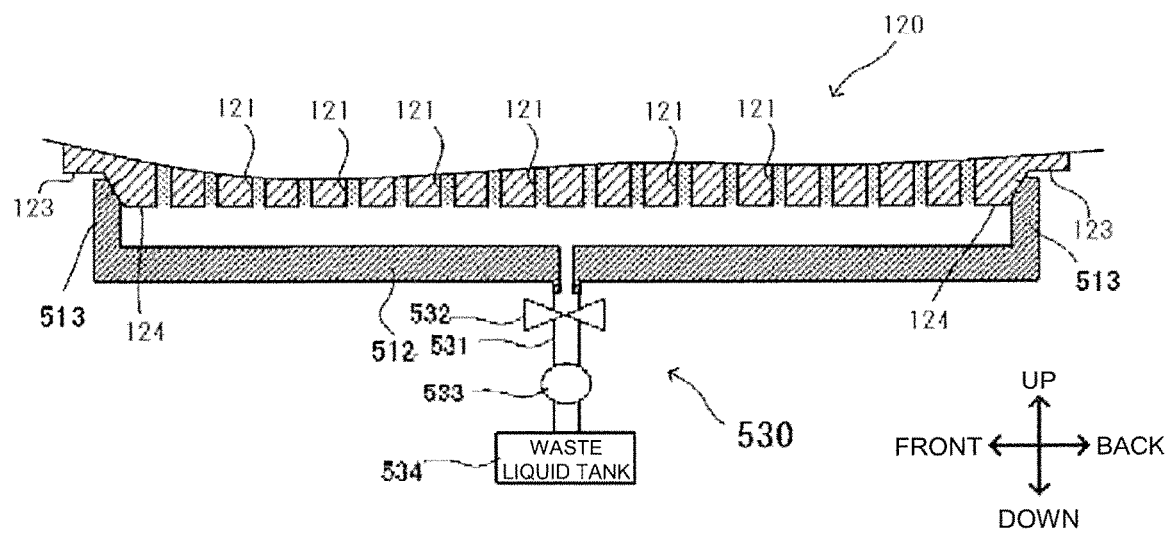
FIG. 6B is a section view of the headcap attached to the first inkjet head and cut in a longitude direction.

As illustrated in FIG. 6A and FIG. 6B, at the time of maintenance, the headcap 510 is attached (in this case, abutted) to the first inkjet head 120 by means of the first driving mechanism 520 (not illustrated in the figure), and covers the ejection surface 124A of the protruding portion 124. The headcap 510 has a concave portion 511 that accommodates the maintenance liquid. The concave portion 511 is shaped so as to match to the protruding portion 124 and is longitude in the sub scanning direction. When the headcap 510 is attached to the first inkjet head 120, the concave portion 511 accommodates and covers the protruding portion 124, the ejection surface 124A, and the ejection port 121A.

The headcap 510 has a bottom part 512 and a side wall 513 that extends to the upward direction from the bottom part 512. The side wall 513 is quadrangular when this is viewed from the above thereof.

The bottom part 512 has a through hole (not illustrated in the figure) in the center thereof. The through hole is made in order to discharge, during the time of purging to be described later, the maintenance liquid having been stored in the concave portion 511. There may be a plurality of the through holes formed.

In the headcap 510, the upper end portion of the side wall 513, namely, the portion that abuts to the protruding portion 124, is formed preferably by an elastic body such as a rubber and a synthetic resin, or by a metal or the like covered with the elastic body so that this portion may be elastic.

The maintenance is conducted to the first inkjet head 120 and the second inkjet head 250. Because the maintenance of both of the heads can be carried out in the same manner, the maintenance of the first inkjet head 120 will be explained hereinafter.

Attachment of Headcap 510

At the time when the maintenance operation starts, the controller 11A causes the first driving mechanism 520 to move the headcap 510 upward thereby pushing and abutting (attaching) the headcap 510 to the first inkjet head 120. FIG. 6A and FIG. 6B illustrate how the abutting takes place. The inclined surface of the protruding portion 124 of the first inkjet head 120 and the inclined surface of the side wall 513 of the headcap 510 match their inclination angles and the like to each other; so, they abut to each other under the state that an inclined surface 124 and an inclined surface of the side wall 513 are matched.

Maintenance by Purging

First, the maintenance by purging, which is a normal maintenance, will be explained.

After the headcap 510 is attached, the controller 11A carries out purging. Specifically, the controller 11A controls an air pressure channel (not illustrated by the figure) to supply a positive pressure to the first subtank 110 during a prescribed period. As a result, the primer ink is ejected from a plurality of the ejection nozzles 121 (ejection ports 121A) of the first inkjet head 120. At this time, the controller 11A causes the valve 532 of the suction device 530 to be closed. Therefore, the concave portion 511 of the headcap 510 is filled with the primer ink.

Ink Suction

Next, the controller 11A controls to cause the valve 532 to open and a pump 533, which is connected to the valve 532 via a pipe 531, to work. With this, the suction device 530 sucks the primer ink in the concave portion 511 thereby discharging the ink to a waste liquid tank 534. At this time, the ink in the concave portion 511 cannot be completely removed; so, the ink can sometimes remain attached to the ejection surface 124A.

Wiping

Next, the controller 11A controls the second driving mechanism 550 to cause the wiping blade 540 to move in the sub scanning direction with contacting to the ejection surface 124A. With this, the ink that is attached to the ejection surface 124A can be wiped out at once from the ejection surface 124A.

Maintenance by Usual Maintenance Liquid

The nozzle clogging can be sometimes unsolved by the maintenance by purging. This can occur, for example, when a cured matter of the UV curable ink is attached. In this case, the maintenance is carried out by a second maintenance liquid (usual maintenance liquid). This will be explained hereinafter.

First, the controller 11A causes the valve 532 of the headcap 510 to be closed. Next, the concave portion 511 is filled with the second maintenance liquid. Filling of the maintenance liquid may be done manually by an operator; but the filling may be done as well by the controller 11A using the maintenance mechanism 500 equipped with a tank for the second maintenance liquid.

Next, the controller 11A causes the first driving mechanism 520 to move the headcap 510 to the upward direction thereby pushing and abutting (attaching) the headcap 510 to the first inkjet head 120. With this, the protruding portion 124, the ejection surface 124A, and the ejection port 121A are soaked in the second maintenance liquid in the concave portion 511. After soaking, this soaking is continued for a certain period (for example, for 1 minute). The second maintenance liquid dissolves the cured matter of the UV curable ink.

Next, the control is done to cause the valve 532 to open and the pump 533 to work. With this, the suction device 530 sucks the second maintenance liquid having dissolved the cured matter of the UV curable ink in the concave portion 511 thereby discharging this liquid to the waste liquid tank 534. When the maintenance liquid attaches to and remains on the ejection surface 124A, the above-mentioned wiping can be conducted.

Maintenance by First Maintenance Liquid

The nozzle clogging can be sometimes unsolved by the maintenance by purging and the maintenance by the second maintenance liquid. This can happen when a water-soluble compound is attached. The second maintenance liquid cannot dissolve the water-soluble compound. In this case, the maintenance is carried out by using the first maintenance liquid. Here, the operation can be conducted in the same way as the maintenance by the second maintenance liquid.

The maintenance by the first maintenance liquid, including filling of the first maintenance liquid, may be done manually by an operator; but the maintenance may be carried out as well by the controller 11A using the maintenance mechanism 500 equipped with a tank for the first maintenance liquid.

As described above, by combining the maintenance by the first maintenance liquid, the maintenance by the second maintenance liquid, and optionally, the maintenance by purging, dirt of the UV curable ink, the cured matter of the UV curable ink attached, and the water-soluble compound attached can be removed; so, the ejection problem of the UV curable inkjet printer 10 can be solved.

Figure 16:
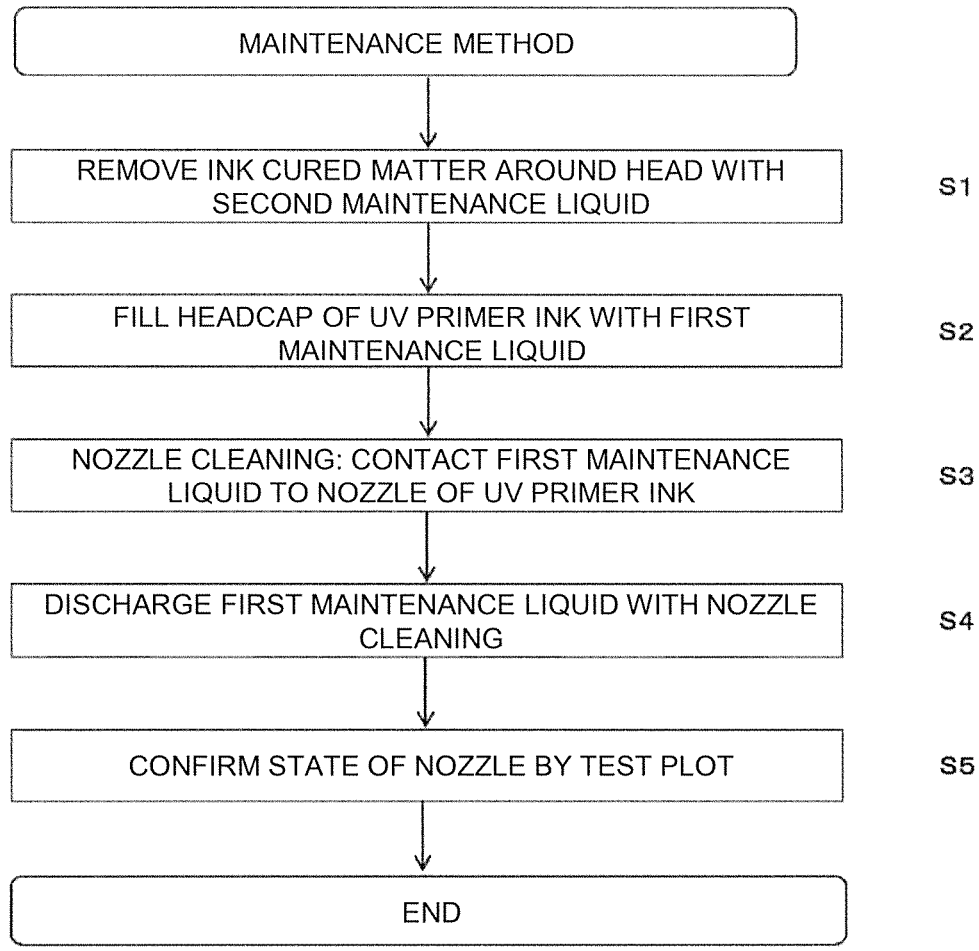
FIG. 16 is the flow chart of the maintenance method according to one embodiment of the present invention.

In FIG. 16, the flow chart of the maintenance method according to one embodiment of the present invention is illustrated. In this maintenance method, first, the ink cured matter around the head is removed with the second maintenance liquid (Step S1). Besides the headcap of the UV curable primer, the ink cured matter in the headcap for a color ink can be removed as well. When the foreign matters that cannot be removed by the second maintenance liquid are present, the next step is carried out.

First, the headcap of the UV curable primer ink is filled with the first maintenance liquid (Step S2). Next, the first maintenance liquid is contacted to the nozzle of the UV curable primer to carry out cleaning of the nozzle (Step S3). The water-soluble foreign matter is dissolved in the first maintenance liquid. Next, the first maintenance liquid in the nozzle is discharged by flashing with the nozzle cleaning (Step S4). Next, the condition of the nozzle is confirmed by the test plot (Step S5). When it is judged that there is no problem in the nozzle, the maintenance is finished. When there still is a problem, either the maintenance is repeated, or the nozzle is exchanged.

EXAMPLES

Hereinafter, the present invention will be explained on the basis of Examples, but the present invention is not limited to these Examples. Evaluation was done by the following methods.

Evaluation about Removal of Water-soluble Foreign Matters by Maintenance Liquid

A UV curable ink containing an acryl-based oligomer of an acidic monomer and, as the photopolymerization initiator, a phosphorous-based initiator is used as the ink (catalogue No. PR-200; manufactured by Mimaki Engineering Co., Ltd.). Printing by the inkjet printer (catalogue No. UJF30/6042-MkII; manufactured by Mimaki Engineering Co., Ltd.) is repeated. The nozzle plate of the inkjet printer head having generated a flight curvature during printing is removed; then, transparent, crystallin foreign matters attached to the wall surface of the nozzle hole are confirmed.

PR-200 contains an aliphatic monomer in the range of 40 to 50% by mass, both inclusive, an acryl-based oligomer in the range of 25 to 35% by mass, both inclusive, an aromatic monomer in the range of 15 to 25% by mass, both inclusive, a photopolymerization initiator in the range of 0.01 inclusive to less than 10% by mass, and 2,6-di-tert-butyl-p-cresol in the range of 0.01 inclusive to less than 0.2% by mass.

Next, a maintenance liquid is dropped onto the nozzle plate; one minute thereafter, the maintenance liquid is removed by hexane. Then, the dissolution of foreign matters in the nozzle hole is checked by a microscope.

Dissolution of the foreign matters by each maintenance liquid as compared with water was evaluated with the following three standards.

X: Foreign matters were not dissolved; so, the foreign matters could not be removed.

Δ: Foreign matters appeared to be dissolved, but some of the foreign matters still remained unresolved, because the solubility therein was lower than water.

O: Foreign matters were dissolved in the same level as water; so, the foreign matters could be removed.

Affinity Evaluation of Maintenance Liquid with Primer Ink

The maintenance liquid and the UV curable ink (catalogue No. PR-200; manufactured by Mimaki Engineering Co., Ltd.) were mixed with the ratio of 1:1; then, the change in the ink was checked to evaluate the affinity of the maintenance liquid with the primer ink in accordance with the following standards.

O: Foreign matters were not formed.

X: Foreign matters were formed.

Safety Assessment of Maintenance Liquid

Assuming actual use environment of the printer, evaluation of the maintenance liquid was made with regard to the safety in handling from the viewpoints of the effects to a human body, storage, and the like in accordance with the following standards.

O: There was no special problem in safety.

Δ: There was a safety problem partially.

X: There was a serious safety problem.

Example 1

Figure 7:
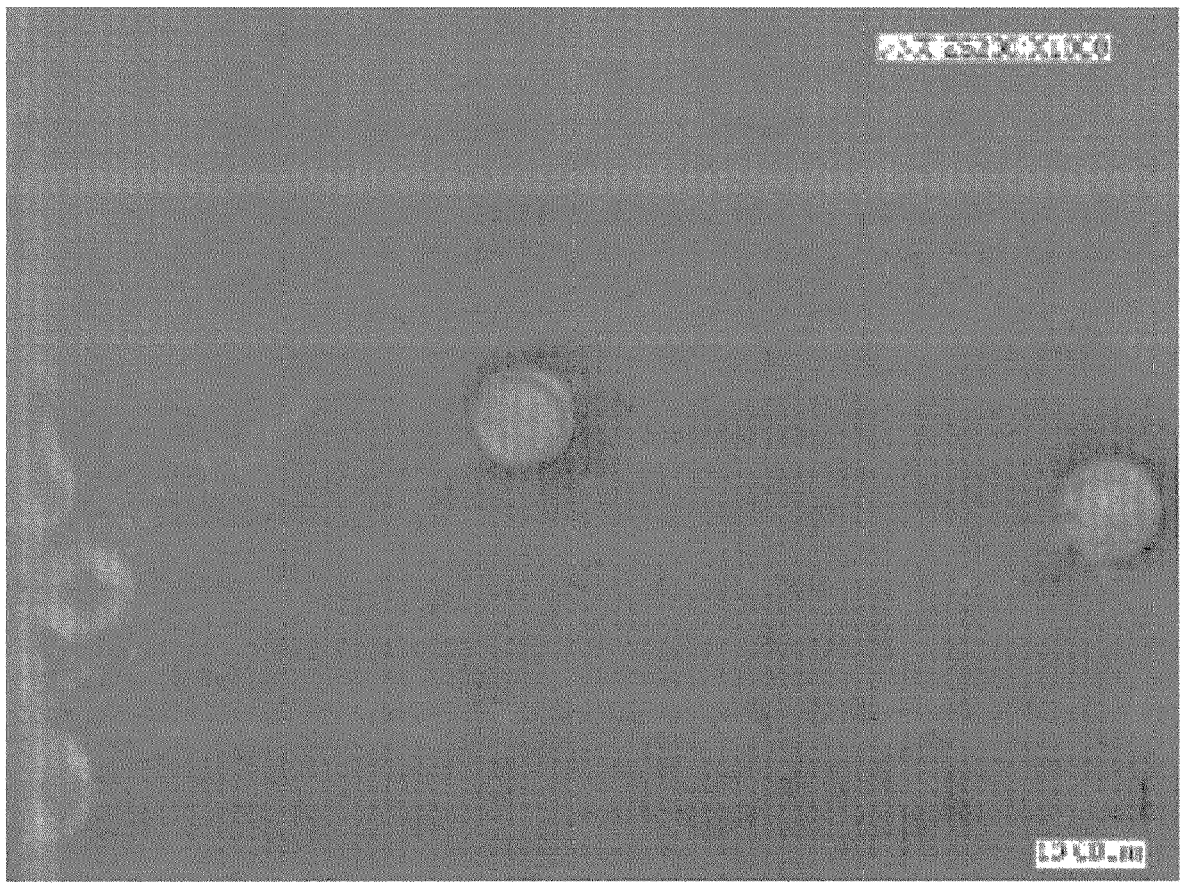
FIG. 7 is a photographic picture of the nozzle plate before the maintenance liquid of Example 1 is dropped.
Figure 8:
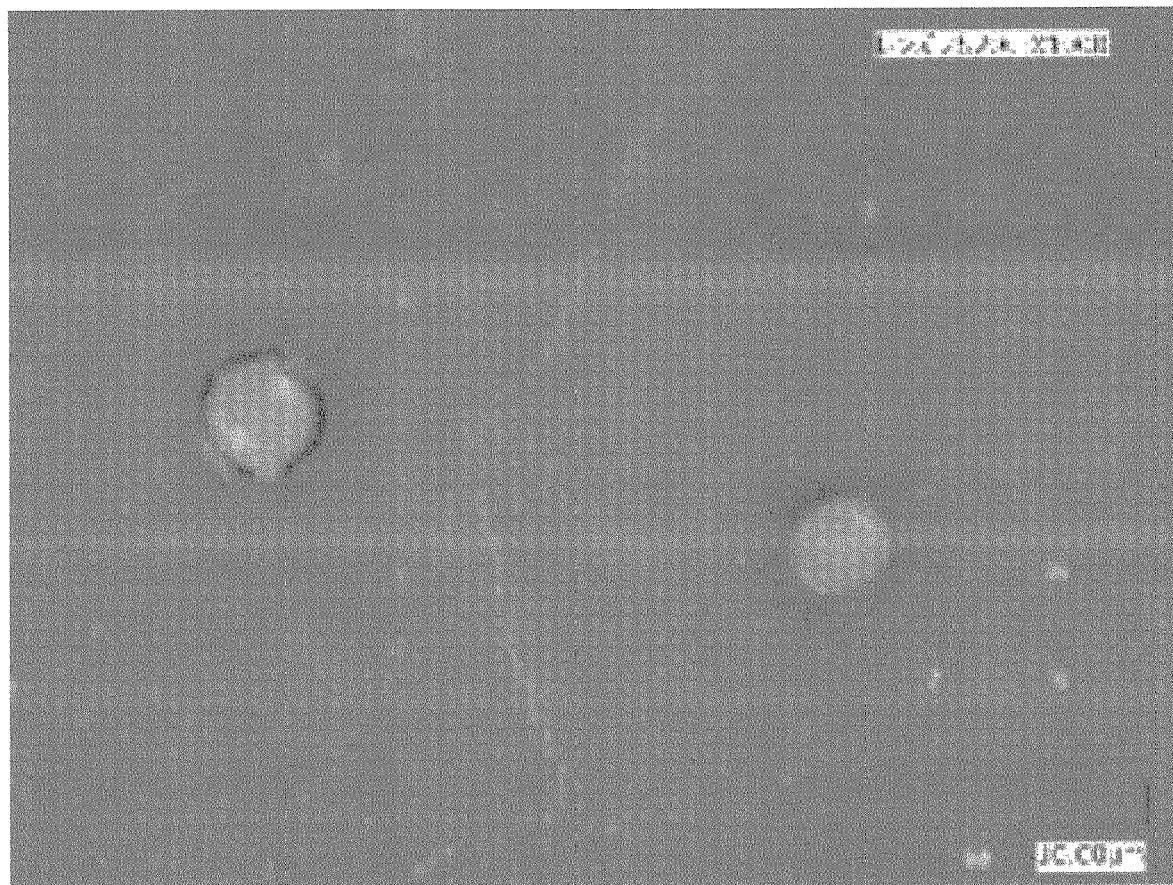
FIG. 8 is a photographic picture of the nozzle plate after the maintenance liquid of Example 1 is dropped.

By using ethyleneglycol as the maintenance liquid E1 for the UV curable inkjet printer, evaluation about removal of water-soluble foreign matter was conducted. The microscopic pictures (magnification of 500) of the nozzle plate having the generated foreign matters taken before the maintenance liquid was dropped, and taken after hexane was added to remove them one minute after the drop of the maintenance liquid are illustrated in FIG. 7 and FIG. 8, respectively. From FIG. 8, it can be seen that the foreign matters in the nozzle hole were dissolved. The evaluation about removal of water-soluble foreign matter is summarized in Table 1.

The affinity of the maintenance liquid E1 with the ink was evaluated. There was no change in the ink performance; so, this liquid was excellent in the affinity with the ink. The affinity with the primer ink and safety of the maintenance liquid E1 were evaluated. These results are summarized in Table 1.

Figure 14:
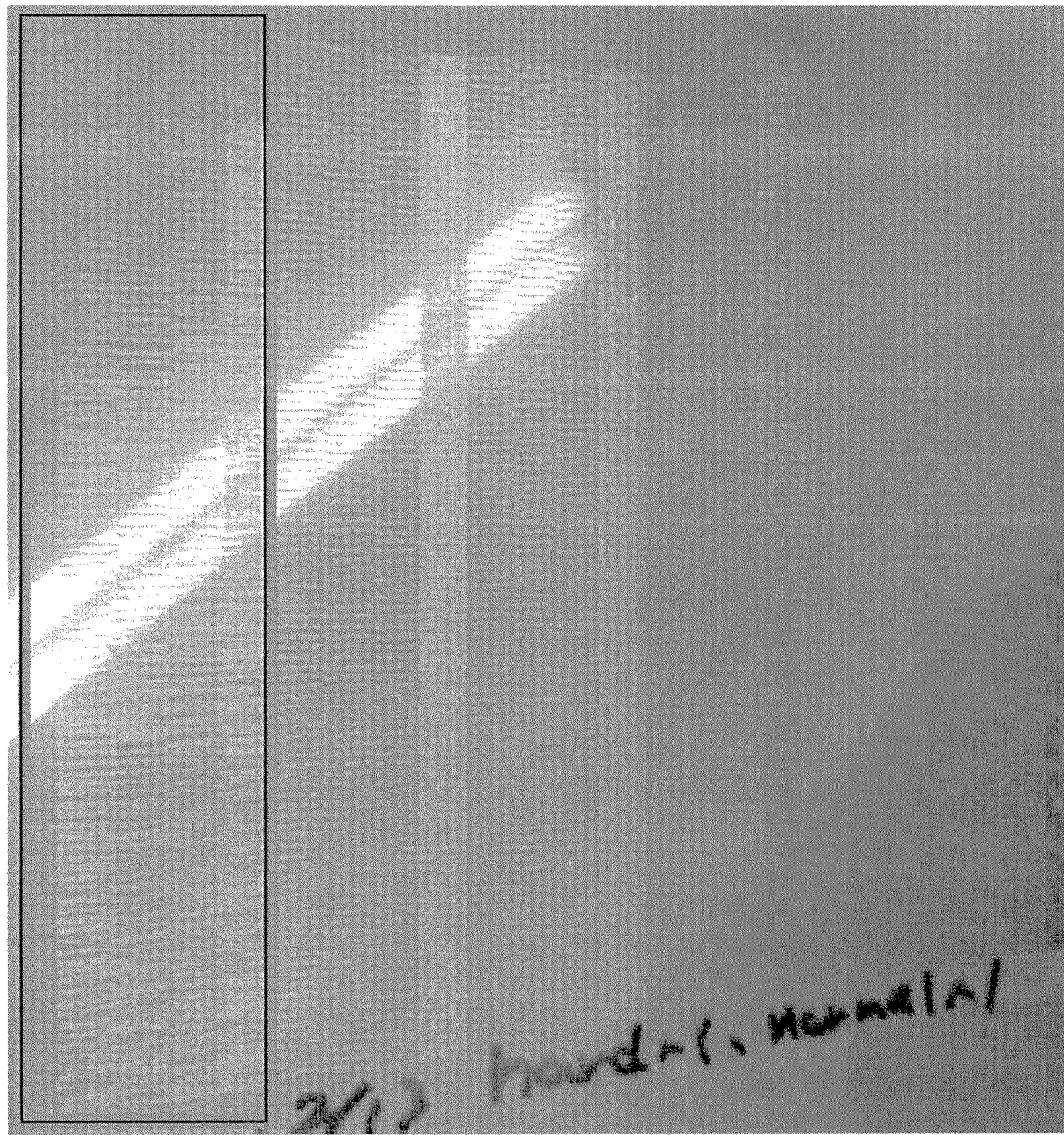
FIG. 14 is a photographic picture of the test plot printed before the nozzle is cleaned with the maintenance liquid of Example 1.
Figure 15:
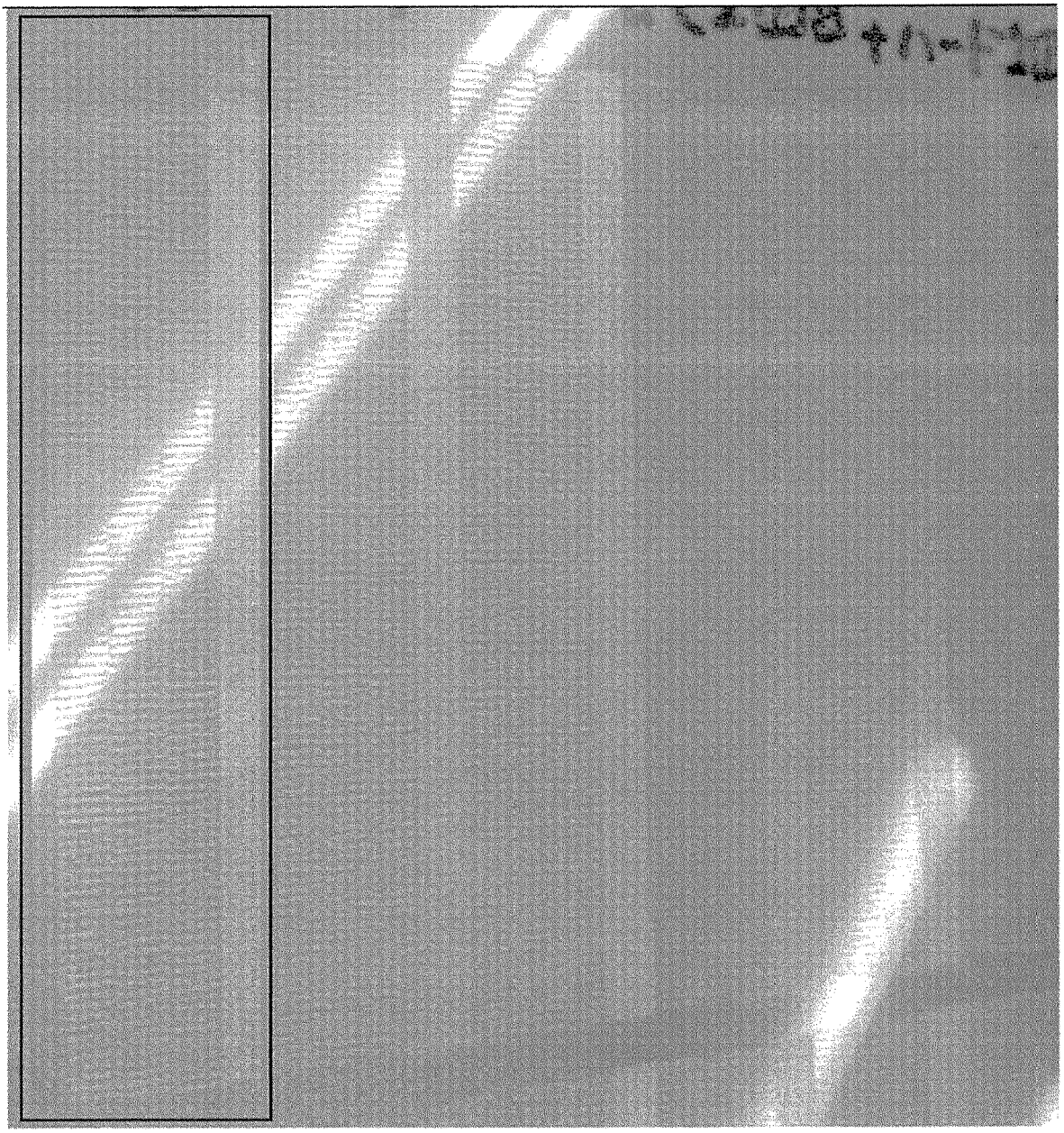
FIG. 15 is a photographic picture of the test plot printed after the nozzle is cleaned with the maintenance liquid of Example 1.

In the evaluation about removal of water-soluble foreign matters, FIG. 14 illustrates the printed photographic picture of the test plot with a flight curvature, and FIG. 15 illustrates the photographic picture of the test plot that was printed one minute after a nozzle was cleaned with the maintenance liquid E1. In the area enclosed by a black line in FIG. 14, it can be observed that in the first column from the left in the pattern, some of the ejection lines (horizontal lines) are irregularly aligned in the directions of up and down as well as right and left, and that some horizontal lines are missing. This suggests that the nozzle corresponding to the portion where the ejection lines are irregularly aligned in the directions of up and down as well as right and left is fouled, and that the nozzle corresponding to the portion where the ejection line is missing is plugged with foreign matters. On the other hand, in FIG. 15, the pattern enclosed with the black line has equal intervals; thus, this is normalized. From these, it can be seen that the fouling and clogging of the nozzle were dissolved by the nozzle cleaning with the maintenance liquid E1, and that the maintenance liquid E1 did not cause an adverse effect to the ink.

Example 2

Figure 9:
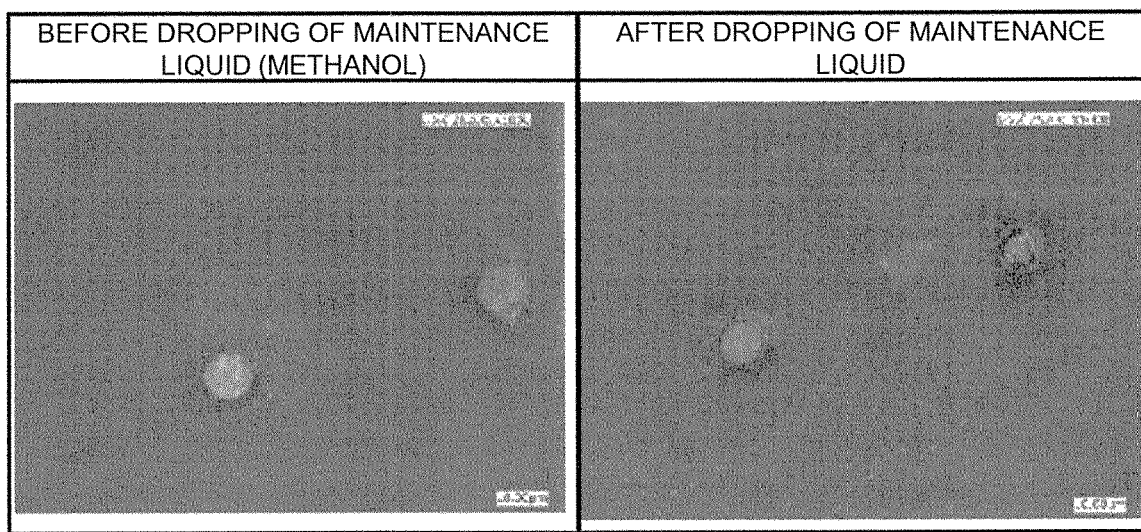
FIG. 9 includes photographic pictures of the nozzle plate before and after the maintenance liquid of Example 2 is dropped.

By using methanol in place of diethyleneglycol, the evaluation about removal of water-soluble foreign matters, affinity evaluation of the maintenance liquid with the primer ink, and safety assessment of the maintenance liquid were carried out in the same way as Example 1. The results are summarized in Table 1. The microscopic picture (magnification of 500) taken before the maintenance liquid was dropped and the picture taken after this was cleaned with hexane one minute after the drop are illustrated in FIG. 9.

Example 3

Figure 10:
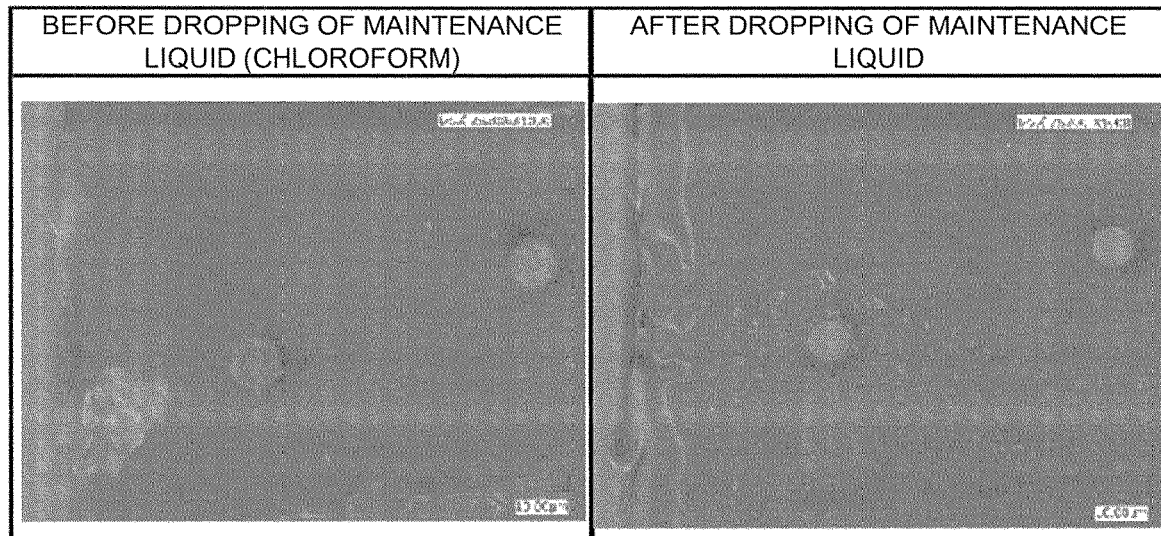
FIG. 10 includes photographic pictures of the nozzle plate before and after the maintenance liquid of Example 3 is dropped.

By using chloroform in place of diethyleneglycol, the evaluation about removal of water-soluble foreign matters, affinity evaluation of the maintenance liquid with the primer ink, and safety assessment of the maintenance liquid were carried out in the same way as Example 1. The results are summarized in Table 1. The microscopic picture (magnification of 500) taken before the maintenance liquid was dropped and the picture taken after this was cleaned with hexane one minute after the drop are illustrated in FIG. 10.

Example 4

Figure 11:
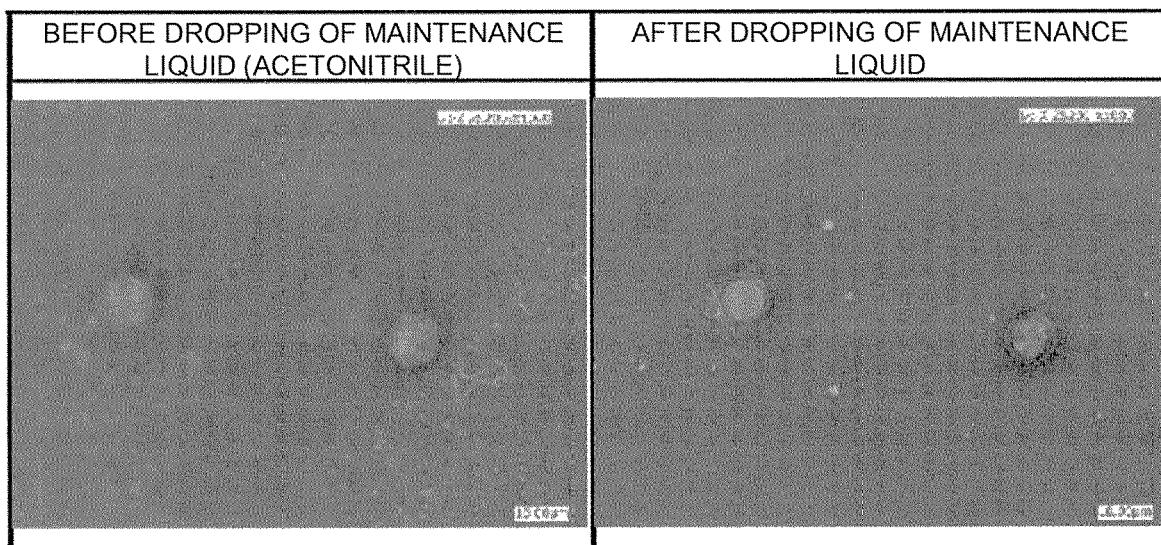
FIG. 11 includes photographic pictures of the nozzle plate before and after the maintenance liquid of Example 4 is dropped.

By using acetonitrile in place of diethyleneglycol, the evaluation about removal of water-soluble foreign matters, affinity evaluation of the maintenance liquid with the primer ink, and safety assessment of the maintenance liquid were carried out in the same way as Example 1. The results are summarized in Table 1. The microscopic picture (magnification of 500) taken before the maintenance liquid was dropped and the picture taken after this was cleaned with hexane one minute after the drop are illustrated in FIG. 11.

Example 5

Figure 12:
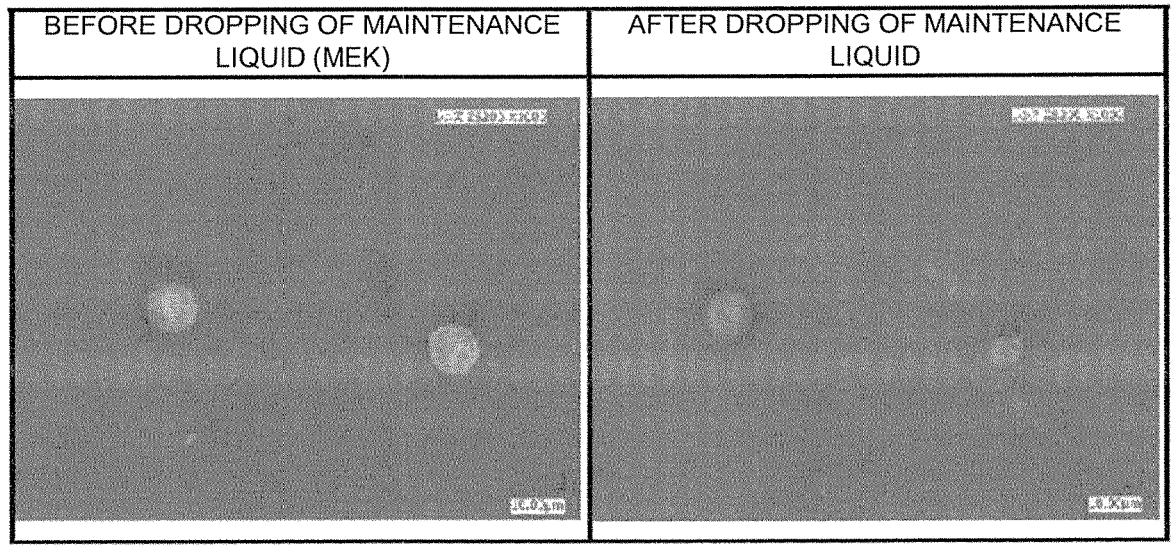
FIG. 12 includes photographic pictures of the nozzle plate before and after the maintenance liquid of Example 5 is dropped.

By using methyl ethyl ketone (abbreviated name: MEK) in place of diethyleneglycol, the evaluation about removal of water-soluble foreign matters, affinity evaluation of the maintenance liquid with the primer ink, and safety assessment of the maintenance liquid were carried out in the same way as Example 1. The results are summarized in Table 1. The microscopic picture (magnification of 500) taken before the maintenance liquid was dropped and the picture taken after this was cleaned with hexane one minute after the drop are illustrated in FIG. 12.

Comparative Example 1

By using diethyleneglycol monoethyl ether acetate in place of diethyleneglycol, the evaluation about removal of water-soluble foreign matters, affinity evaluation of the maintenance liquid with the primer ink, and safety assessment of the maintenance liquid were carried out in the same way as Example 1. The water-soluble foreign matters were not dissolved. The results are summarized in Table 1.

Comparative Example 2

Figure 13:
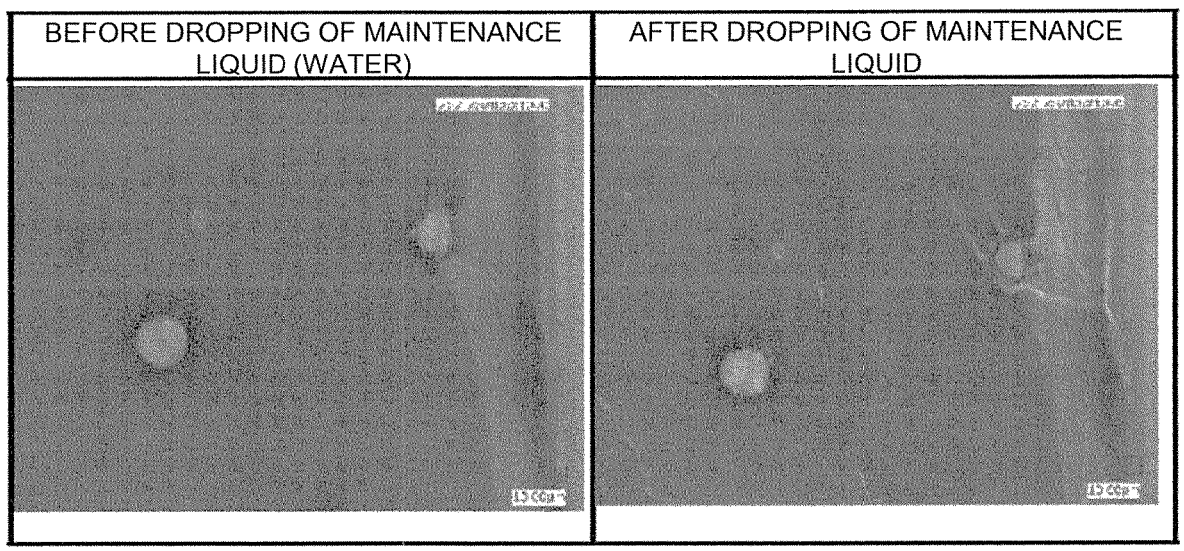
FIG. 13 includes photographic pictures of the nozzle plate before and after the maintenance liquid of Comparative Example 2 is dropped.

By using water in place of diethyleneglycol, the evaluation about removal of water-soluble foreign matters, affinity evaluation of the maintenance liquid with the primer ink, and safety assessment of the maintenance liquid were carried out in the same way as Example 1. The water-soluble foreign matters were dissolved. The results are summarized in Table 1. The microscopic picture (magnification of 500) taken before the maintenance liquid was dropped and the picture taken one minute after this was cleaned with hexane are illustrated in FIG. 13.

Comparative Example 3

By using ethyl acetate in place of diethyleneglycol, the evaluation about removal of water-soluble foreign matters, affinity evaluation of the maintenance liquid with the primer ink, and safety assessment of the maintenance liquid were carried out in the same way as Example 1. The water-soluble foreign matters were not dissolved. The results are summarized in Table 1.

Comparative Example 4

By using dimethyl sulfoxide (abbreviated name: DMSO) in place of diethyleneglycol, the evaluation about removal of water-soluble foreign matters, affinity evaluation of the maintenance liquid with the primer ink, and safety assessment of the maintenance liquid were carried out in the same way as Example 1. The water-soluble foreign matters were not dissolved. The results are summarized in Table 1.

Comparative Example 5

By using γ-butyrolactone (abbreviated name: GBL) in place of diethyleneglycol, the evaluation about removal of water-soluble foreign matters, affinity evaluation of the maintenance liquid with the primer ink, and safety assessment of the maintenance liquid were carried out in the same way as Example 1. The water-soluble foreign matters were not dissolved. The results are summarized in Table 1.

Comparative Example 6

By using N-methyl-2-pyrrolidone (abbreviated name: NMP) in place of diethyleneglycol, the evaluation about removal of water-soluble foreign matters, affinity evaluation of the maintenance liquid with the primer ink, and safety assessment of the maintenance liquid were carried out in the same way as Example 1. The water-soluble foreign matters were not dissolved. The results are summarized in Table 1.

Comparative Example 7

By using polymethacrylate (abbreviated name: PMA) in place of diethyleneglycol, the evaluation about removal of water-soluble foreign matters, affinity evaluation of the maintenance liquid with the primer ink, and safety assessment of the maintenance liquid were carried out in the same way as Example 1. The water-soluble foreign matters were not dissolved. The results are summarized in Table 1.

TABLE 1

| | Ingredient | Solubility of foreign matters | Affinity with primer ink | Safety |
|---|---|---|---|---|
| Comparative Example 1 | Diethyleneglycol monoethyl ether acetate | X | ○ | ○ |
| Comparative Example 2 | Water | ○ | X | ○ |
| Example 1 | Diethyleneglycol | ○ | ○ | ○ |
| Example 2 | Methanol | ○ | X | Δ |
| Example 3 | Chloroform | ○ | ○ | Δ |
| Example 4 | Acetonitrile | Δ | ○ | Δ |
| Comparative Example 3 | Ethyl acetate | X | ○ | Δ |
| Comparative Example 4 | DMSO | X | ○ | X |
| Comparative Example 5 | GBL | X | ○ | Δ |
| Example 5 | MEK | Δ | ○ | Δ |
| Comparative Example 6 | NMP | X | ○ | X |
| Comparative Example 7 | PMA | X | ○ | X |

The present invention can have various embodiments and modification without departing from the spirit and claims of the present invention in a wide meaning. The embodiments described above are to explain the present invention, not to limit the claims of the present invention. In other words, the range of the present invention is not expressed by the embodiments but by the claims. Various modifications that are carried out within the claims or the equivalent thereof are deemed to be within the claims of the present invention.

What is claimed is:

1. A maintenance liquid for an ultraviolet (UV) curable inkjet printer, the maintenance liquid comprising:
    a first ingredient in which a water-soluble compound is soluble and a cured matter of a UV curable ink is insoluble, and
    a second ingredient in which the water-soluble compound is insoluble and the cured matter of the UV curable ink is soluble,
    wherein
    the first ingredient is configured to dissolve the water-soluble compound, which is a crystal-like solid matter originated from an acidic monomer and an initiator included in the UV curable ink, and water,
    the initiator is a phosphorous-based initiator; and
    the second ingredient is configured to dissolve the cured matter of the UV curable ink.

2. The maintenance liquid according to claim 1, wherein the first ingredient is diethyleneglycol, and
    the second ingredient is diethyleneglycol monoethyl ether acetate.

3. The maintenance liquid according to claim 1, wherein the first ingredient in the maintenance liquid is in a range of 90% to 100% by mass, and
    the water in the maintenance liquid is in a range of 10% or less by mass.

4. The maintenance liquid according to claim 1, wherein the second ingredient in the maintenance liquid is in a range of 10% to less than 90% by mass.

5. An ink set for an ultraviolet (UV) curable inkjet printer, the ink set comprising:
    the maintenance liquid according to claim 1,
    wherein
    the water-soluble compound that adheres to an inkjet head included in the UV curable inkjet printer is dissolved in the first ingredient; and the cured matter of the UV curable ink is dissolved in the second ingredient.

\* \* \* \* \*